United States Patent
Zakheim

[11] 3,898,664
[45] Aug. 5, 1975

[54] LANDING SYSTEM WITH VARIABLE ANGULAR ELEVATION GLIDE PATH

[75] Inventor: Jacques Zakheim, Paris, France

[73] Assignee: Office National d'Etudes et de Recherches Aerospatiales, Chatillon-Sous-Bagneux, France

[22] Filed: Mar. 11, 1974

[21] Appl. No.: 449,595

[30] Foreign Application Priority Data
Mar. 14, 1973 France .............................. 73.09105

[52] U.S. Cl. ......................... 343/108 M; 343/106 R
[51] Int. Cl. .............................................. G01s 1/44
[58] Field of Search ........................ 343/108 M, 106

[56] References Cited
UNITED STATES PATENTS

| | | | |
|---|---|---|---|
| 2,977,592 | 3/1961 | Bruck | 343/108 M |
| 3,202,994 | 8/1965 | Fombonne | 343/108 M X |

Primary Examiner—Maynard R. Wilbur
Assistant Examiner—Richard E. Berger
Attorney, Agent, or Firm—Abraham A. Saffitz

[57] ABSTRACT

System for directing an aircraft along a glide path of variable angular direction. At a ground station, a generator of a radiofrequency carrier feeds an antenna radiating a lobe shaped directive pattern and the angular direction of the antenna lobe is scanned according to a cyclic reciprocating movement. The rate of variation of the lobe angular direction is linear in function of time and is equal for the two directions of the reciprocating scan movement. The carrier is modulated by a modulating signal whose frequency varies linearly and cyclically in function of time with a rate of variation equal to the rate of variation of the lobe angular direction and with a phase delay with respect to the lobe angular direction variation. Aboard the craft, the modulated carrier is demodulated and a circuit is provided for detecting the instants at which the frequency of the modulating signal is equal to a predetermined value. The sum of the amplitudes of the modulating signal at said instants represents the elevation of the glide path.

3 Claims, 7 Drawing Figures

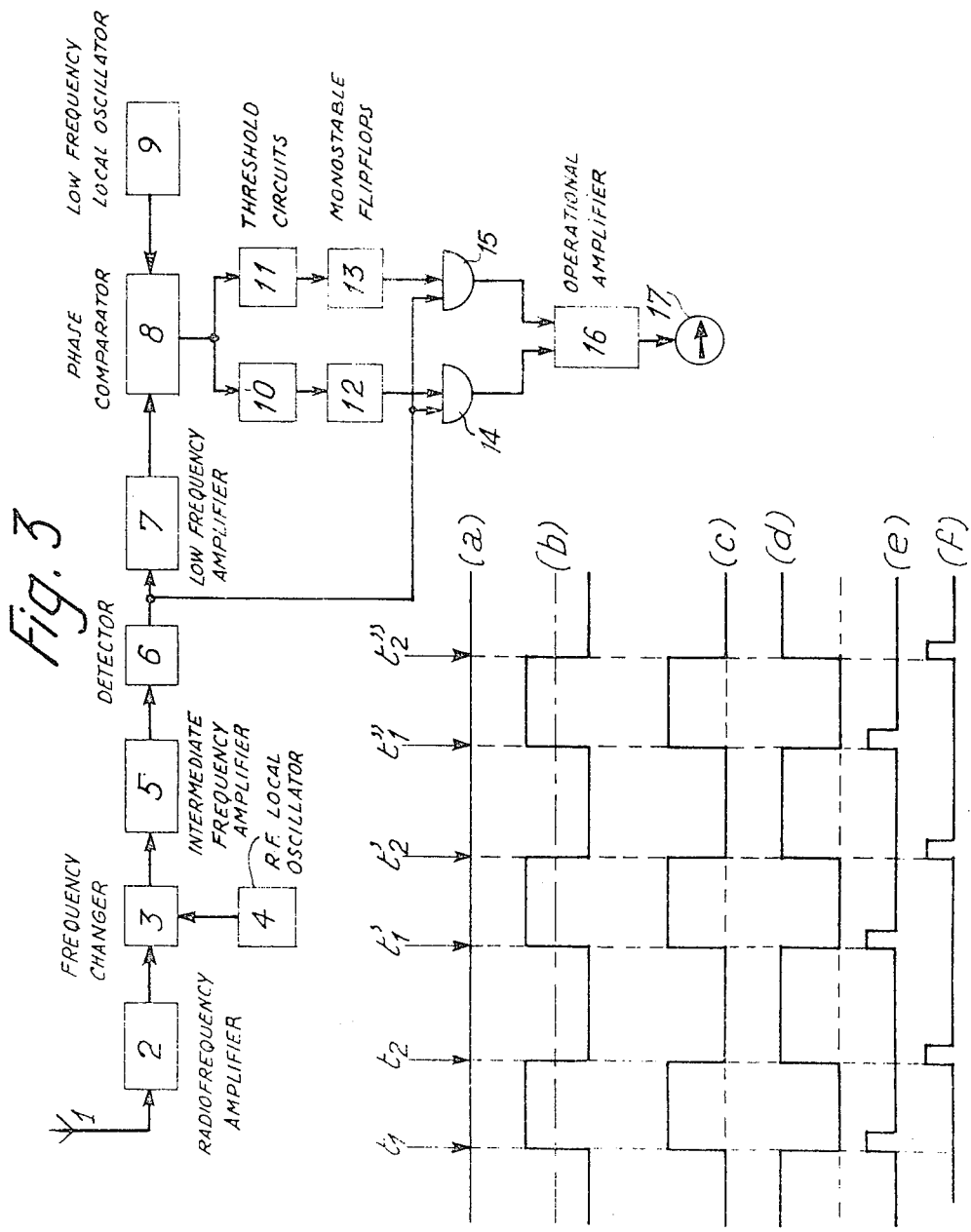

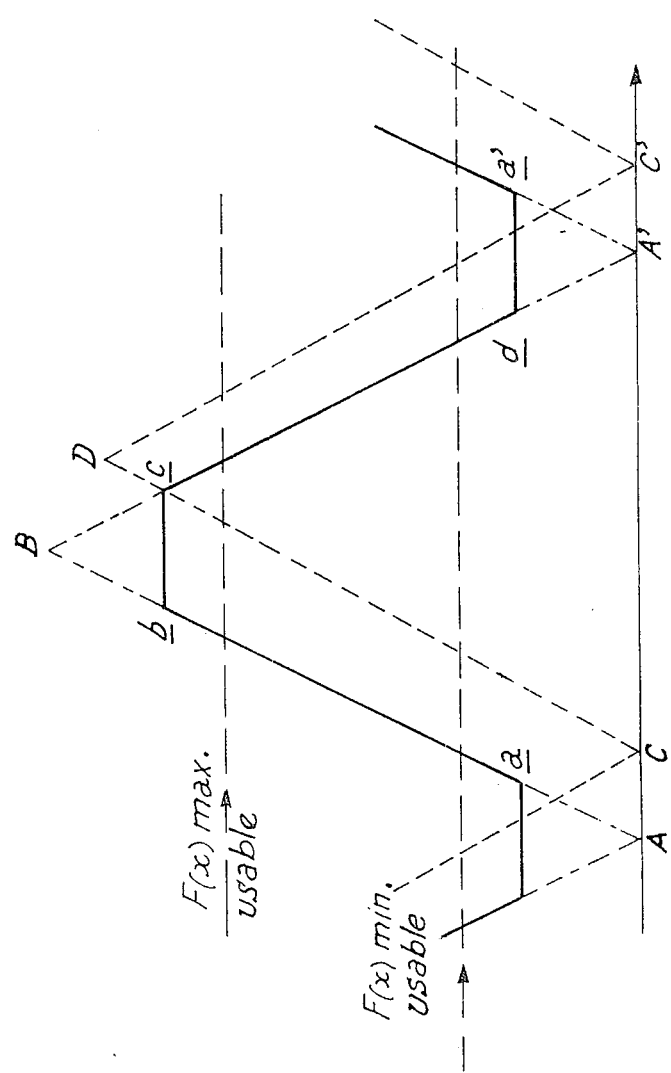

LANDING SYSTEM WITH VARIABLE ANGULAR ELEVATION GLIDE PATH

The present invention generally relates to an aircraft landing system defining glide paths of variable angular elevation.

A known landing procedure is to locate at ground level a transmitter associated with a directional transmit antenna which generates a lobe of radiofrequency energy having a reciprocation movement in a vertical plane. The carrier frequency is amplitude modulated by a low-frequency modulating signal which is itself frequency modulated proportionally to the elevation of the lobe. The radiofrequency signal is then:

$$y = A_o [1 + mg(t)] \sin 2\pi ft$$

where $f$ is the frequency, $A_o$ the amplitude of the unmodulated carrier, $m$ the degree of amplitude modulation and $g(t) = (1 + aE)F$; where E is the lobe elevation and F the frequency of the unmodulated low-frequency signal. The aircraft is thus able to derive its elevation from the instantaneous frequency $g(t)$ of the modulating signal at the time where it is scanned by the lobe.

In the prior art system, the modulating signal is cophasal with the lobe reciprocation movement and the radiofrequency carrier is modulated only during one direction of reciprocation, say during the up going scans, the transmit carrier being not modulated during the down gong scans. Such an installation can be used for aircraft landing from various glide paths, depending on the type of craft involved, but the radiated beam must be as narrow as possible in the scan direction if accurate guidance is to be obtained. This constraint implies using very complex and costly antennae.

Another procedure is to use a transmitter in which the transmit lobe rotates around a fixed axis which is aligned with the glide path. The axis of the lobe describes a cone, therefore, and not a plane. The receiver is set in such a way that any amplitude modulation of the signal received is cancelled when the craft follows the definite path. This system is difficult to implement and lacks accuracy.

The present invention does away with these drawbacks. The general feature consists of generating a carrier signal amplitude or frequency modulated by a low frequency modulating signal having an instantaneous frequency which varies according to the displacement of the oscillating lobe in its path. The onboard receiver of the aircraft is tuned to a preset frequency and receives two successive signals for each elevation reading and the pilot manoeuvres so as to achieve equal signal intensity. The displacement is, therefore, along a rectilinear path which is a function of the preset tuning frequency of the receiver. Measurement, thus, becomes differential and there is no longer the stringent requirement on the narrowness of the beam and consequencly the antennae can be of simpler design technically with respect to other scan beam guidance systems, for the same degree of accuracy in the readings.

The object, features and advantages of the present invention will become more apparent upon reading the following detailed description and examining the accompanying drawings in which:

FIG. 3 is a block diagram for the receiver, as per the invention characteristics, for the aircraft guidance system considered herein;

FIG. 5 shows an "elevation-frequency" diagram as a function of time-cycle, different from that used in FIG. 1, which can be used in the invention.

In all these figures, the same elements carry the same reference numbers.

Figure 1:
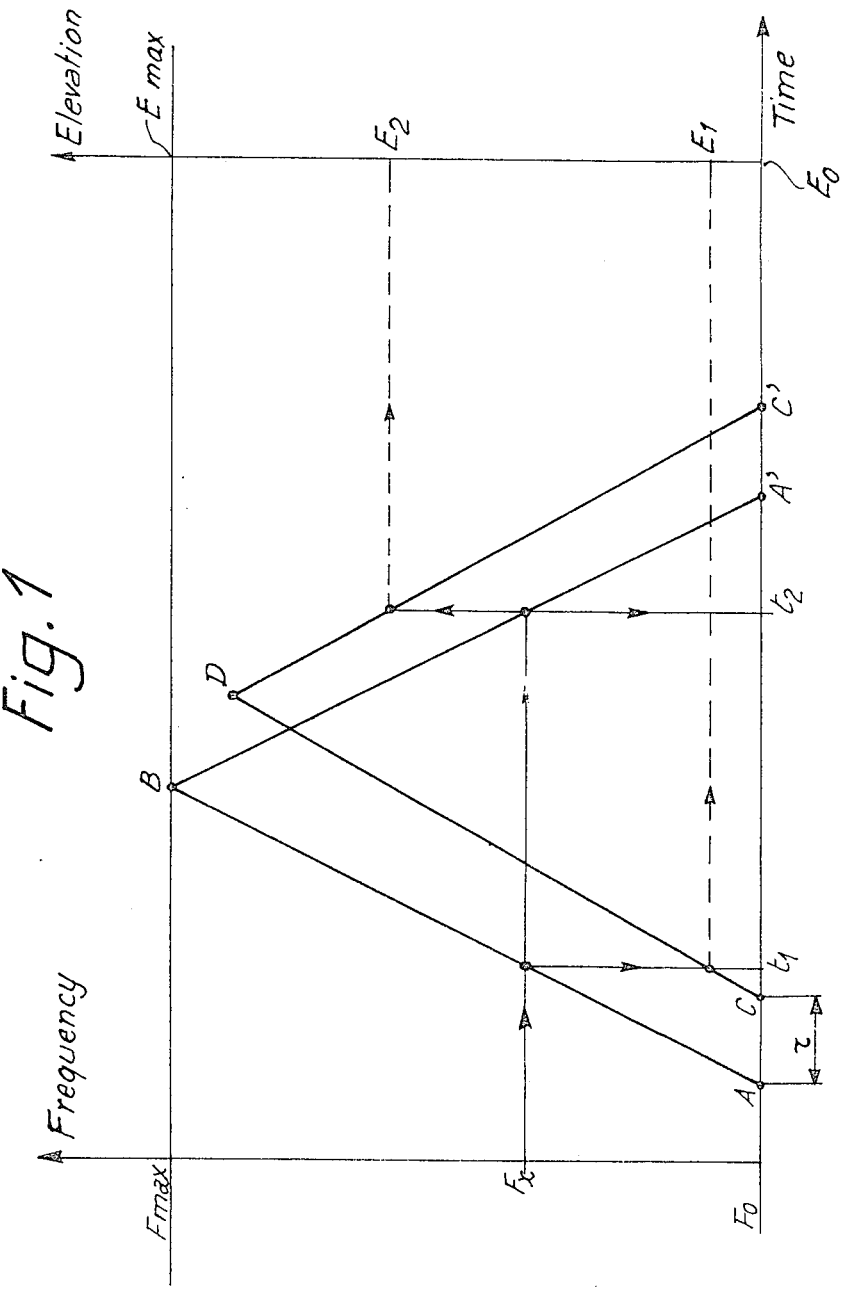
FIG. 1 shows an "elevation-frequency" diagram, as a function of time-cycle used in the invention.

FIG. 1 shows an "elevation-frequency" diagram as a function of time. Variation in elevation of the axis of the transmit lobe is represented by the isoceles triangle CDC' (repeated of course by translations equal to CC' along the time axis) made up of two straight segments CD and DC', where segment CD corresponds to the elevation variation between the minimum value $E_o$ and the maximum value $E_{max}$ during the up going phase of the transmit lobe movement, while the segment DC' corresponds to the down going phase of the lobe movement.

The frequency F of the signal modulating the radiofrequency carrier obeys a law which is identical to that controlling the elevation variation of the transmit lobe, and with the same period T, but with both curves shifted by an amount $\tau$. The variation of this frequency F is, therefore, represented by the isoceles triangle ABA', where the time differences AC and AC' are both equal to $\tau$. The frequency F varies between two frequencies $F_o$ and $F_{max}$.

The onboard receiver contains in its "low frequency" part devices which make it sensitive to a specific presettable value $F_x$ which lies in the range $F_o \rightarrow F_{max}$ The system operates by comparing the amplitude of the radiofrequency signals at times when the low frequency signal $F_x$ is detected as the up-going lobe and the down going lobe scan the aircraft receiver antenna.

It is assumed that the aircraft receiver circuits are tuned to the value $F_x$ for the modulating signal frequency. During the half-period which corresponds to the evolution of the frequency F according to segment AB, the mobile receiver receives a signal at time $t_1$. At this instant, the lobe has the elevation $E_1$. During the half-period which corresponds to the evolution of the frequency F according to segment BA', in FIG. 1, the mobile receiver receives a signal at time $t_2$. At this instant, the lobe has the elevation $E_2$, higher than $E_1$.

Figure 2:
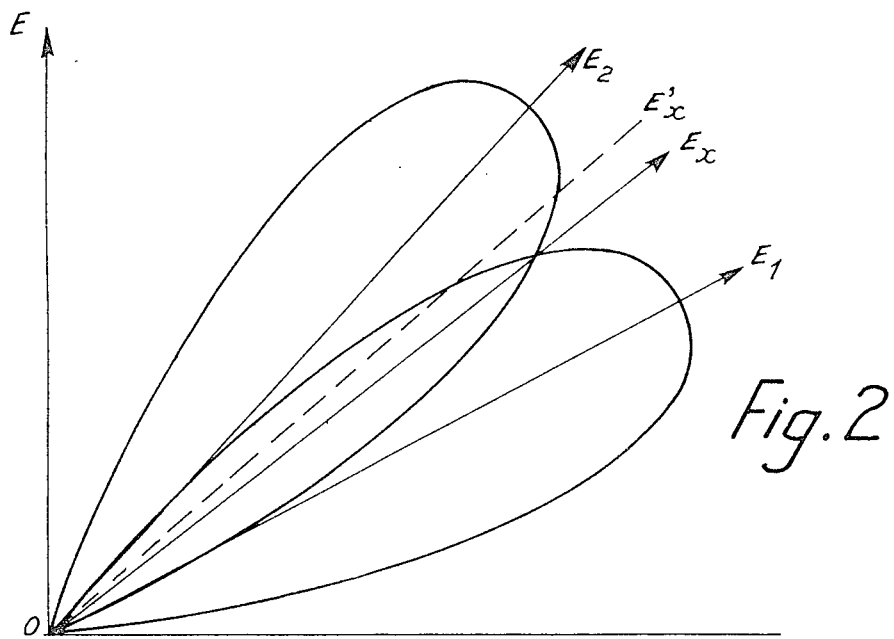
FIG. 2 represents the antennae transmit radiation pattern for two predetermined elevation values corresponding to a same modulation frequency.

If the mobile receiver, with respect to the transmit antenna, is aligned at an elevation angle $E_x$ such that $E_x = ½ (E_1 + E_2)$, the two radiofrequency signals received in succession by the mobile receiver will have equal intensity levels. This can be better seen in FIG. 2, in which the two transmit lobes corresponding to the two elevations $E_1$ and $E_2$ are shown, i.e. corresponding to the same modulation frequency $F_x$, one of these lobes being the up-lobe and the other being the down-lobe. Equality of the two recceived signals corresponds to the received frequency $F_x$ and is obtained for the direction $E_x$ which indeed has the value ½ $(E_1 + E_2)$ and which bissects the angle $E_1$ $E_2$ if one allows that the transmit lobes keep their shape during the scan. If, on the other hand, there is inequality in the intensity, and the descent path of the aircraft aligns with $E_r'$ then the sign of the difference of the intensities enables location of $E_r'$ with respect to $E_r$.

An apparatus measuring the intensity of the onboard received radiofrequency signals and comparing them, therefore, enables location of the direction $E_r$ and acquires knowledge as to whether the mobile receiver is aligned or not with this direction. As can be seen each value of $F_r$, the chosen modulation frequency, corresponds to a single and unique value for the site direction $E_r$, so that, if the pilot wishes to follow a predetermined site angle, he need only have the onboard receiver circuits preset to the value $F_r$ corresponding to the desired frequency and then in the manoeuvre procedure for the aircraft to seek and maintain equality of the signal intensities received at this frequency.

Conversely, if the mobile receiver is in some position, it can seek the value $F_r$ of the frequency on which the signals received have the same intensity and therefrom determine the value $E_r$ of the elevation of the aircraft as seen by the ground installation.

If the airborne apparatus has a device which is capable of indicating the direction of change of the chosen frequency $F_r$ when the latter is received, i.e., is capable of defining if the receiver is in the up-going phase or the down-going phase of the frequency-time diagram, a displacement of the mobile receiver with respect to the chosen elevation $E_r$ will not only generate an intensity inequality for the signals received, but also an inequality associated to the notion "too high" or "too low". From this a servoloop (manual or automatic) can be implemented to correspond to dislacement of the craft to a given elevation value.

FIG. 3 represents a first embodiment of an airborne reeceiver for allowing an aircraft to follow a glide path of variable elevation.

Figure 3A:
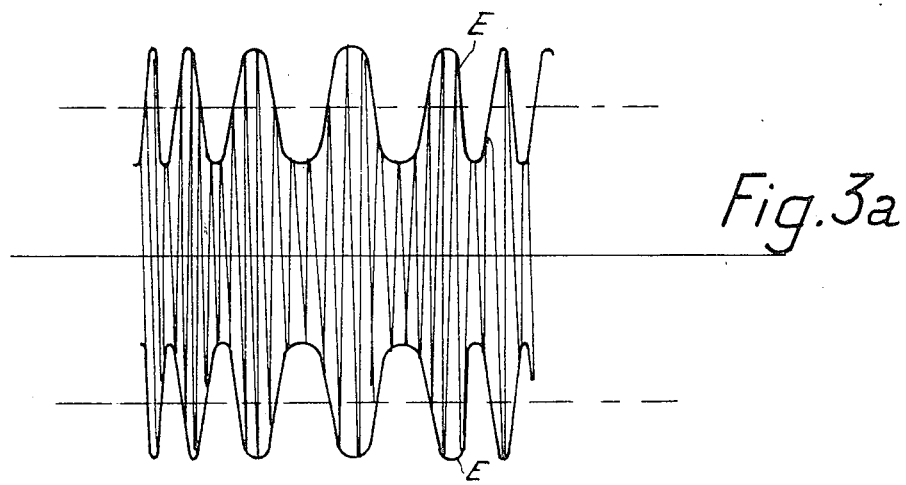
FIG. 3a shows the carrier which is amplitude modulated by a frequency modulated modulating signal.

Referring first to FIG. 3a, the radiofrequency signal is amplitude modulated by a low frequency modulating signal $g(t)$. The modulating signal $g(t)$ is itself frequency modulated according to a saw-tooth saw. Therefore, amplitude-detection of the radiofrequency signal reconstitutes the signal $g(t)$.

The receiver in FIG. 3 comprises an antenna 1, a radiofrequency amplifier 2, a frequency changer 3, a local oscillator 4, an intermediate frequency amplifier 5, a detector 6, a low freaucncy amplifier 7, a phase comparator 8, a presettable low frequency generator 9, and two measurement paths 10, 12, 14 and 11, 13, 15 with two threshold circuits 10 and 11, two monostable flipflops 12 and 13 and two AND gates 14 and 15 whose outputs are connected to a differential amplifier 16, itself connected to a meter apparatus 17.

This receiver operates as follows:

The radiofrequency signals are collected by antenna 1 and are firstly amplified in the radiofrequency stage 2; then they undergo a frequency change at 3. After intermediate amplification at 5, these signals reach the detector 6 which gives a low frequency, frequency modulated output signal. Also at the output of 6, there is a direct voltage whose amplitude is a function of the intensity level of the radiofrequency signal received, i.e., proportional to the intensity level of the transmit lobe for the elevation corresponding to the low frequency received.

The low frequency output signal from 6 is transmitted via amplifier 7 to phase-comparator 8, while the D.C. voltages are applied to the inputs of the AND-gates 14 and 15 which are normally non-conducting.

The second input of phase-comparator 8 is connected to a low frequency generator 9, with presettable frequency values.

The comparator 8 is of the type, the main characteristics of which are as follows:

a. when fed by two signals at the same frequency, but phase-shifted with each other, the phase-comparator produces a D.C. voltage output signal the amplitude and sign of which correspond respectively to the value and the direction of the phase angle;

b. when fed by two signals of different frequency, the phase-comparator gives a positive output voltage, or a negative output voltage depending on whether the frequency of one of the signals (that supplied by 7 for example) is greater or smaller than the frequency of the second signal (that supplied by the generator 9 for example).

A detailed description of such phase-comparator will be found in the article "Use I.C.S. in your Phase Locked Loop" by William L. GILL and A. DEEN OGDEN appeared in "Electronic Design", Vol. No. 8, Apr. 11, 1968, pages 76–80.

It is to be assumed that the frequency of generator 9 has been set to the value $F_r$ as indicated in FIG. 1. During the modulation time-cycles, the low-frequency signal produced by detector 6 goes through this value at time $t_1$, $t_2$, $t_1'$, $t_2'$, $t_1''$, $t_2''$, etc . . .

Between times $t_1$ and $t_2$ and between $t_1'$ and $t_2'$, etc., the frequency of the signal coming from the detector via amplifier 7 is higher than the frequency of the signal supplied by generator 9. Phase-comparator 8 then gives a D.C. positive voltage during this time interval. Between times $t_2$ and $t_1'$, then $t_2'$ and $t_1''$, etc., the frequency received from 6 is lower than that supplied by 9 and the phase-comparator delivers a negative signal. This situation is illustrated by diagram (b) of FIG. 3 which represents the output signal of the phase-comparator 8.

The voltage at the output of the comparator is applied to threshold circuits 10 and 11 comprising amplifiers which saturate rapidly and with a settable saturation threshold arrangement. For circuit 10, saturation is obtained for positive going signals while circuit 11 acts on negative going signals. For all values of the input signals which do not bring about saturation, the output voltage of the 10–11 subsystem remains nil, in such a way that the signals coming from these threshold circuits may be set out in the diagrams (c) and (d) of FIG. 3.

These signals are then fed to the monostable flipflops 12 and 13 which trigger on the rise edge of the input signal. The voltages given by these flip-flops are shown in (e) and (f), the pulse widths being the same for both paths.

Thus, the assembly comprising the phase-comparator 8, the two threshold circuits 10 and 11 and the two monostable flip-flops 12 and 13 enables constant width pulses to be applied to the control gates 14 and 15 at times $t_1$, $t_2$, $t_1'$, $t_2'$, etc. At these aforementioned times, the gates let through the D.C. signal coming from the detector 6 towards the differential amplifier 16 which has an integrator circuit embodied therein. Amplifier 16 is connected to a zero centred indicator unit 17.

The D.C. voltages coming from the detector 6, and which are a function of the intensity level of the radiofrequency field acting upon the receive antenna at times $t_1, t_2, t_1', t_2', \ldots$ are subtracted from each other, and the mean value of their difference is displayed by deviation of the zero centred pointer of the indicator unit 17.

The direction and the degree of side movement of the pointer of the indicator unit 17 bear a relationship to the position (too high or too low) of the aircraft with respect to the elevation value $E_x$ the value of which has been chosen by selecting the corresponding value of $F_x$ on the generator unit 9.

Figure 4A:
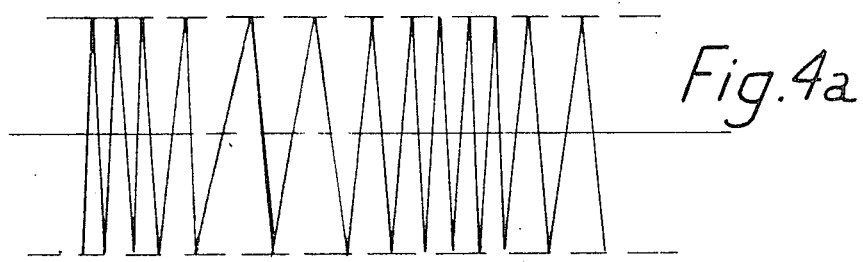
FIG. 4a shows a modulation diagram used in the receiver set out in FIG. 4.

In the second implementation of the invention, the high frequency transmit carrier is frequency modulated, as shown in FIG. 4a, but is not amplitude modulated. The modulation in this case is applied directly to the radiofrequency carrier itself.

Figure 4:
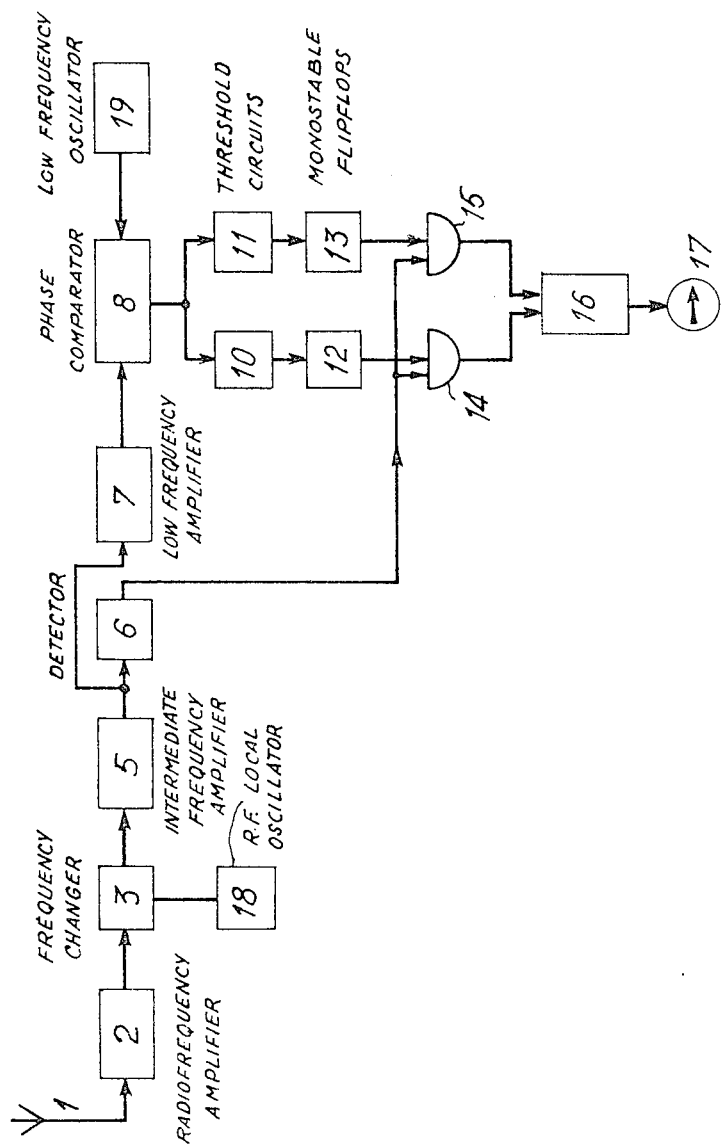
FIG. 4 is the block diagram of another receiver, as per the invention characteristics, for the aircraft guidance system under consideration.

The corresponding receiver is represented in FIG. 4. The blocks bearing the same reference numbers as in FIG. 3 have the same functions. Most of the units in FIG. 3 are repeated here, but with the following differences:

the local oscillator 18 which enables the frequency transposition in the receiver must have a variable frequency facility so as to be able to tune the entire receive path to the frequency $F_x$ which is here a radiofrequency;

one of the inputs of the phase-comparator 8 is fed with a signal coming directly from the intermediate amplifier 5; the intermediate frequency varies according to the setting of local oscillator 18;

the frequency of the signal supplied by the generator 19, connected to the second input of the phase-comparator 8, is constant and has a value equal to the value or the intermediaite frequency for a predetermined setting of local oscillator 18.

As regards the transmitter and the tranmit antenna, they are similar to those of prior art system with the exception that the signal modulating the transmit carrier is phase shifted with respect to the reciprocation movement of the antenna lobe and is maintained during the two directions of movement of the lobe, the switching means which in the prior art system prevent the modulation during one of the two directions of movement of the lobe being here omitted.

The modulation frequency can only vary between two useful limit valued $F_x$min and $F_x$max contained between the extreme limits of the diagram in FIG. 1 which correspond to the frequencies of points A and B. Under these conditions, it is preferable to give the variation diagram of this frequency as a function of time, the form represented by the curve $a,b,c,d,a' \ldots$ in FIG. 5. This plot has a trapezoidal form and is no longer triangular. This variant has the advantage of reducing the system's pass-band, while still using frequencies which are really usable.

It should be recalled here that the system described above concerns elevation guidance whereby the pilot of the aircraft choses himself the angle of descent. The same system can also be implemented for azimuth orientation, the vertical reciprocation movement of the transmit antenna lobe being replaced by a horizontal movement, whereas the rest of the guidance system remains the same.

A combination of elevation and azimuth orientation guidance would comprise an integral zero visibility landing system, whereby the pilot of the aircraft would chose an azimuth direction and a landing site to suit his approach requirements.

What I claim is:

1. A system for directing an aircraft along a path of variable angular direction comprising, at a ground station, a generator of a radiofrequency carrier, an antenna fed by said radiofrequency carrier and having a lobe shaped directive pattern, means for varying the angular direction of the antenna lobe according to a cyclic reciprocating scan movement, the rate of variation of said lobe angular direction being linear in function of time and being equal for the two directions of the reciprocating scan movement, means for modulating said carrier frequency by a modulating signal whose frequency varies linearly and cyclically in function of time with a rate of variation equal to the rate of variation of said lobe angular direction and with a phase delay with respect to said lobe angular direction variation and, aboard said craft, means for demodulating said radiofrequency carrier and detecting said modulating signal, means for detecting the instants at which the frequency of said modulating signal is equal to a predetermined value, means for adding the amplitudes of the modulating signal at said instants thereby obtaining a resultant signal for each cycle of the modulating signal and means for integrating said resultant signal.

2. A system for directing an aircraft along a path of variable angular direction according to claim 1, in which the means for modulating the carrier frequency by a modulating signal whose frequency varies linearly and cyclically in function of time is an amplitude modulator means, and the means for demodulating said radiofrequency carrier and detecting said modulating signal is an amplitude demodulator means.

3. A system for directing an aircraft along a path of variable angular direction according to claim 1, in which the means for modulating the carrier frequency by a modulating signal whose frequency varies linearly and cyclically un function of time is a frequency modulator means and the means for demodulating said radiofrequency carrier and detecting said modulating signal is a frequency demodulator means.

* * * * *